J. S. BANCROFT.
COMPARATOR.
APPLICATION FILED NOV. 6, 1906.

944,404.

Patented Dec. 28, 1909.
2 SHEETS—SHEET 1.

Witnesses

INVENTOR
John S. Bancroft
BY
Church & Church
ATTORNEY.

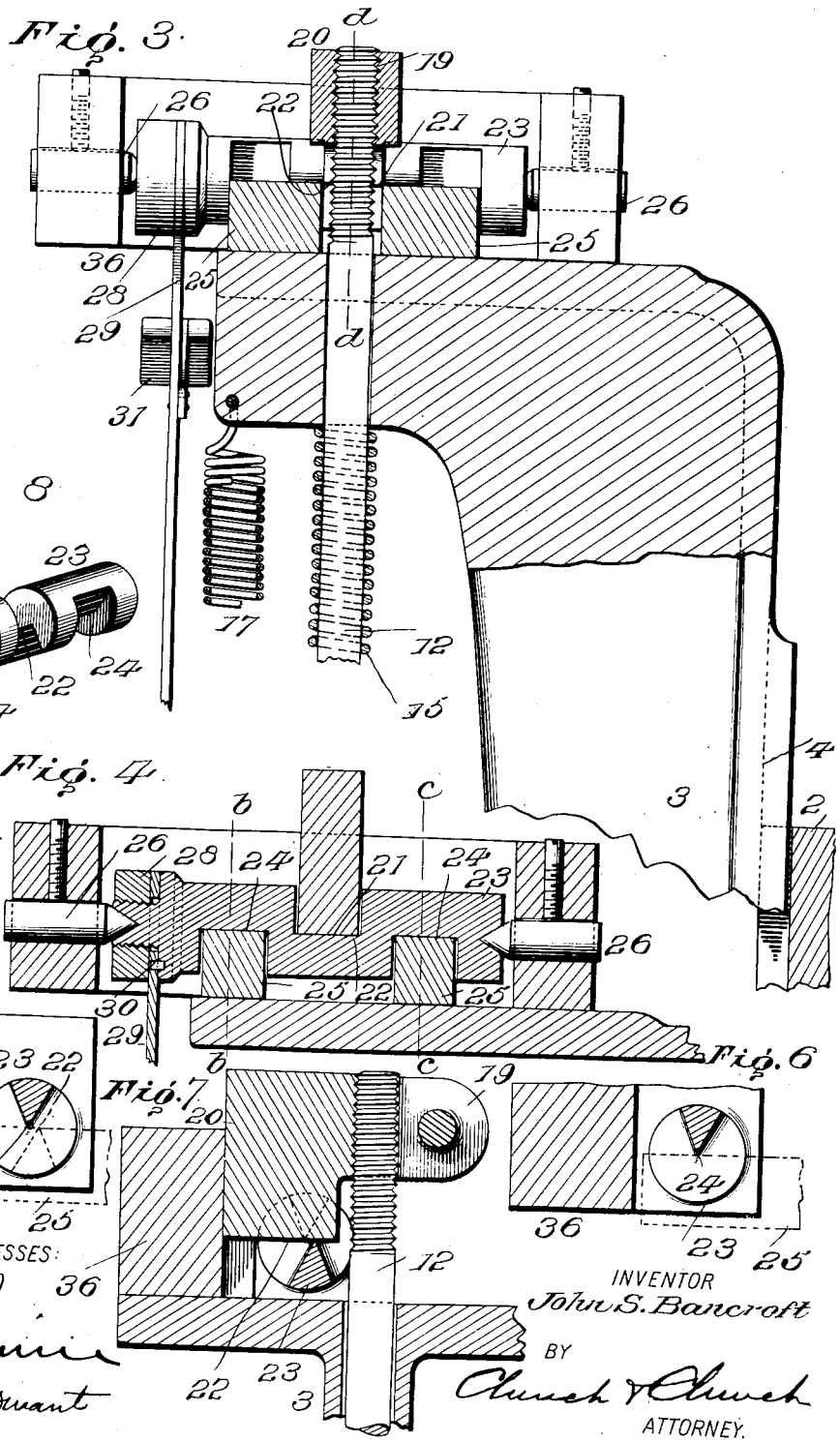

UNITED STATES PATENT OFFICE.

JOHN SELLERS BANCROFT, OF PHILADELPHIA, PENNSYLVANIA, ASSIGNOR TO LANSTON MONOTYPE MACHINE COMPANY, OF PHILADELPHIA, PENNSYLVANIA, A CORPORATION OF VIRGINIA.

COMPARATOR.

944,404.

Specification of Letters Patent. Patented Dec. 28, 1909.

Application filed November 6, 1906. Serial No. 342,236.

*To all whom it may concern:*

Be it known that I, JOHN SELLERS BANCROFT, a citizen of the United States, residing at Philadelphia, in the county of Philadelphia and State of Pennsylvania, have invented certain new and useful Improvements in Comparators; and I do hereby declare the following to be a full, clear, and exact description of the same, reference being had to the accompanying drawings, forming a part of this specification, and to the figures and letters of reference marked thereon.

This invention relates to that class of measuring instruments or appliances employed in modern standardizing methods to measure dimensions of individuals relatively to one another or to a standard, and to indicate the degree of departure from said standard, and it has for its principal object to provide a simple and effective proportioning connection between the measuring and indicating members, whereby increased delicacy, accuracy and endurance are attained and the process of production simplified.

To these ends the invention consists in the novel construction, combination and arrangements of parts hereinafter fully described and set forth in the claims.

Figure 1:
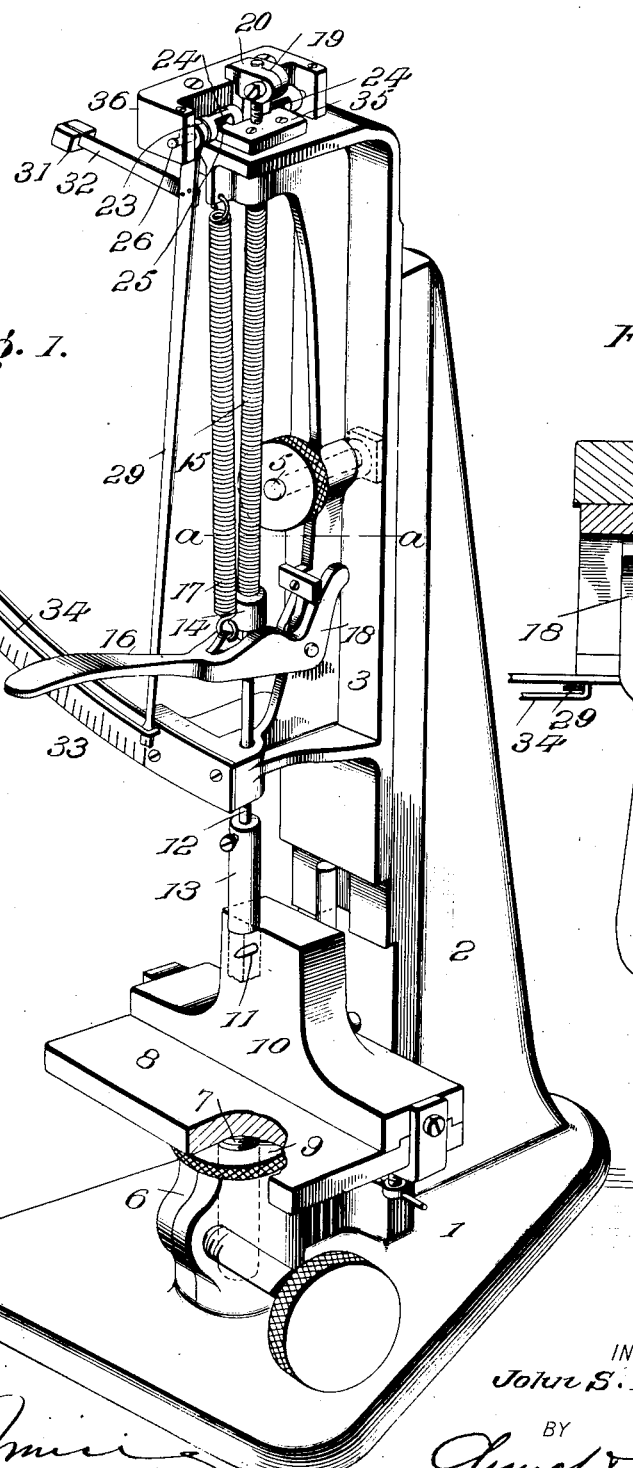
Figure 2:
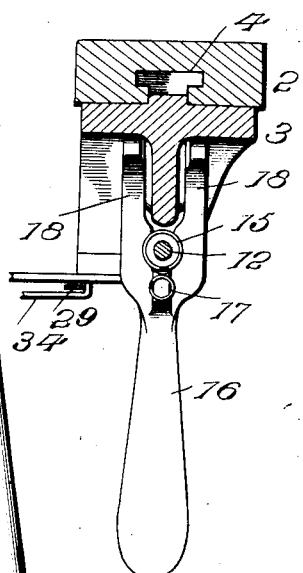

In the accompanying drawings illustrating a preferred form of embodiment—Figure 1 is a perspective view of the improved comparator. Fig. 2 is a horizontal section on line *a—a*, of Fig. 1. Fig. 3 is a partial vertical section through the carrying head in the plane of the measuring rod or connection. Fig. 4 is a vertical section through the proportioning mechanism taken on an irregular line intersecting the knife edges of the proportioning bar or member. Fig. 5 is a sectional view on the line *b—b*, Fig. 4. Fig. 6 is a section on the line *c—c*, Fig. 4. Fig. 7 is a section on the line *d—d*, Fig. 3. Fig. 8 is a perspective view of the proportioning bar.

The same numerals designate corresponding parts in the several figures.

The apparatus illustrated is specially designed to facilitate very rapid inspection and accurate measurement or comparison of work required to be finished within exceedingly small limits, such as the parts of type molds, matrices, &c.; and the unit of measurement being as small as one ten thousandths of an inch. It comprises a main frame 1, provided with an upright or post 2, faced for the reception of the adjustable carrying head 3, and provided with a T-groove 4 for the reception of a clamping bolt 5 carried by said head 3. The base of the main frame is also provided with a split socket 6 for the reception of a spindle 7 attached to table 8, said spindle carrying an adjusting nut 9 on its threaded portion, whereby the height of the table can be regulated. As shown there is mounted upon the table a gage block 10 provided with a pin 11 adapted to enter the transverse suspension opening in a matrix block, this fixture being specially adapted for use in locating the matrix block when gaging the ends relative to said transverse opening. A clamping screw such as shown in Fig. 1 may be applied to the split socket for retaining spindle in adjusted position.

Reciprocating longitudinally in guides in the head 3 is the measuring member or rod 12 whose lower end is adapted to contact with the article to be tested or measured. In the present instance the lower end of said rod is equipped with a flat ended head 13 for engaging the flat end of the matrix to gage the latter and in so doing cause the matrix to assume an upright position. Rod 12 is provided with a collar 14 between which and the frame is interposed a spring 15 tending to depress said rod (in the event its weight is insufficient to insure its descent) and beneath said collar extends a lever 16 pivoted on the head 3 and coupled with a spring 17 acting in opposition to spring 15 (or gravity) and of superior power. The lever 16 is also provided with arms 18, movable between stops on head 3 and serving to limit the motion of lever 16 and rod 12 controlled thereby.

The upper end of rod 12 is threaded into a split threaded socket 19 on or in a head 20, the latter guided to move vertically and provided with a hardened and dressed contact surface 21 extending at right angles in position to engage the central knife-edge bearing 22 of the proportioning bar 23, the latter furnished with two knife-edge fulcrum bearings 24 located in a plane to one side of bearing 22 and resting upon the parallel supporting blocks 25 carried by head 3.

Bar 23 is furnished at opposite ends with sockets for the reception of alined pivot pins 26 carried by a frame or block 36 detachably secured to head 3, and one end of said bar is reduced and threaded for the reception of a nut 28 between which and the shoulder on bar 23 is clamped the hand or pointer 29 of the indicating devices. A pin 30 prevents independent rotation of pointer 29, and a weight 31 applied to an arm 32 carried by said pointer serves to return the latter after displacement. The free end of the pointer coöperates with a graduated scale 33 carried by head 3 and provided with a guard 34 for preventing displacement and limiting the excursions of said pointer.

When not in use the parts assume the position indicated in Fig. 1, the pointer being held at one extreme of its movement by weight 31 and lever 16 elevated to extreme position by the action of its spring 17 the latter overcoming spring 15 and elevating rod 12 until arrested by the contact of arms 18 with their rear stop. In this position head 20 is slightly removed from its knife-edge bearing 22 on the proportioning bar 23.

If both excess and deficiency measurements are to be performed the zero mark on the scale will be located intermediate the opposite extremes of the path traversed by the indicator arm of pointer 29; but if excess only is to be measured the zero mark will be located at or near the upper or left hand extreme of the scale.

To set the apparatus for comparative measurements the table or rod 12 or both are adjusted so that the interval between the table or the support thereon and the lower end of rod 12 will correspond with the dimension to be measured, when head 20 engages knife-edge bearing 22 and the indicator arm or hand 29 is pointing to zero on the scale. In making this adjustment a templet or standard sample is usually employed as a gage. When, now it is desired to compare other articles with the standard, they are placed in position, one at a time, beneath rod 12 and pressure is brought to bear upon lever 16 overcoming spring 17 and permitting rod 12 to descend under the action of spring 15 (or of gravity) until arrested by contact with the article. Assuming the apparatus is organized to measure excess only, if the article is of standard dimensions the pointer will stand at zero, and if it is too large the excess will be indicated by the pointer.

In practice, the readings are in ten thousandths of an inch, and that such minute fractions may be accurately indicated and on a scale sufficiently large to be read direct and with ease without the intervention of a magnifying glass, it is of the utmost importance that the means for multiplying the motion of the measuring member (rod 12) and transmitting the same to the indicating member (pointer 29) should be constructed with the utmost degree of accuracy, hence special attention has been given this feature both with respect to accuracy and facility of manufacture.

The supporting blocks 25 constitute extensions of a plate or block 35 secured to head 3 and together with the contact block or head 20 carried by rod 12 are furnished with flat contact faces such as can readily be produced with great accuracy; and that the proportioning elements are wholly contained in the bar 23. These comprise the knife edges 22, 24, located in parallel planes at a distance apart corresponding with the leverage desired, with the power bearing 22 intermediate the fulcrum bearings 24 to afford stable support for the lever, said bearings being produced by cutting away opposite sides of the bar on intersecting planes parallel with the axis of the bar. It is also to be noted that the proportioning bar is fulcrumed wholly upon knife edges 24 and not upon the pivot pins 26, the latter being loosely fitted and serving merely as retainers to prevent material displacement of bar 23, to which end said pins 26 are arranged in alinement with knife edges 24. It will also be noted that contact head 20 is located above its bearing 22 on the proportioning bar 23 and is caused to engage therewith, to actuate the pointer, only when the lever 16 is depressed in effecting a measurement. The purpose of this is to prevent injury to the knife edges or their coöperating surfaces when, as not infrequently happens, the finger is suddenly withdrawn from the lever 16 and the latter permitted to fly back responsive to the action of its spring 17, in which event the head 20 is lifted clear of the proportioning or fulcrum bar 23, the latter being returned by its slower acting counter weight.

The fitting and assembling of the indicating, proportioning and measuring members is greatly facilitated by the construction shown, as the only accurate fitting is between plain straight surfaces.

Having thus described my invention, what I claim as new and desire to secure by Letters Patent, is—

1. In an instrument such as described provided with measuring and indicating devices or members, the combination therewith of the following elements, to wit; a proportioning member or lever coupled with the indicating device and provided with a plurality of knife edge fulcrum bearings in the same plane and a reversed knife edge bearing located to one side of the fulcrum bearings; and a contact surface coupled with the measuring member and movable in a path intersecting said reversed knife edge bearing.

2. In an instrument such as described the combination of the following elements, to wit; a proportioning member provided with a plurality of knife edge fulcrum bearings and an intermediate reversed knife edge contact or power bearing; axial retainers for said proportioning member; fulcrum blocks for said proportioning member; a longitudinally movable measuring member provided with a lateral extension in the path of the contact or power bearing; and an indicating member coupled with said proportioning member.

3. In an apparatus such as described, the combination of the following elements, to wit; a proportioning member or bar provided with reversed knife edge fulcrum and power bearings; a furcated support for said fulcrum bearings; retaining devices in axial alinement with the fulcrum bearings, for positioning the proportioning members; a contact surface guided to reciprocate in a plane perpendicular to and intersecting the power bearing; a measuring member coupled to said contact surface; and an indicating member coupled to the proportioning member.

4. In an apparatus such as described the combination of the following elements to wit:—a fixed abutment or support and an opposite movable measuring member; means for automatically retracting said measuring member; a proportioning member provided with fulcrum and contact bearings, and a contact surface carried by the measuring member and engaging said proportioning member during the advance of the measuring member but free to separate therefrom during the retracting movement of said measuring member.

5. In an apparatus such as described the combination of the following elements to wit: a support; a reciprocatory measuring member provided with a contact surface opposite said support; a proportioning member interposed between said contact surface and support and provided with reversed knife edge bearings; a spring for advancing the measuring member in a direction to engage its contact surface with the proportioning member; a lever arranged to intercept the advance of the measuring member; and a spring coupled with said lever and operating through the latter to retract the measuring member.

6. In an apparatus such as described provided with opposed and relatively movable supporting and measuring members and in combination therewith a proportioning member coupled with indicating devices and interposed between said supporting and measuring members, said proportioning member consisting of a bar provided with three interior knife edge bearings serially disposed longitudinally of the bar with the intermediate bearing reversed in relation to the end bearings, each of said bearings being formed by beveling opposite sides of the bar on converging planes whereof those pertaining to the end bearings intersect at the axis of oscillation of the bar while those of the intermediate bearing intersect to one side of said axis.

JOHN SELLERS BANCROFT.

Witnesses:
 MORTIMER A. JONES,
 W. A. ROSSITER.